(12) United States Patent
Lair

(10) Patent No.: US 8,711,775 B2
(45) Date of Patent: Apr. 29, 2014

(54) SMS TRANSPORT RESOURCE CONTROL

(75) Inventor: Yannick Lair, Reading (GB)

(73) Assignee: NEC Corporation, Tokyo (JP)

( * ) Notice: Subject to any disclaimer, the term of this patent is extended or adjusted under 35 U.S.C. 154(b) by 275 days.

(21) Appl. No.: 13/147,143

(22) PCT Filed: Jan. 20, 2010

(86) PCT No.: PCT/JP2010/050995
§ 371 (c)(1),
(2), (4) Date: Jul. 29, 2011

(87) PCT Pub. No.: WO2010/087350
PCT Pub. Date: Aug. 5, 2010

(65) Prior Publication Data
US 2011/0286417 A1    Nov. 24, 2011

(30) Foreign Application Priority Data

Jan. 30, 2009    (GB) .................................. 0901539.7

(51) Int. Cl.
*H04W 4/00*    (2009.01)

(52) U.S. Cl.
USPC ............................. 370/328; 370/329; 370/331

(58) Field of Classification Search
None
See application file for complete search history.

(56) References Cited

U.S. PATENT DOCUMENTS

2010/0120455 A1*  5/2010  Aghili et al. .................. 455/466
2010/0265884 A1* 10/2010  Vikberg et al. ............... 370/328

FOREIGN PATENT DOCUMENTS

| CN | 101022653 A | 8/2007 |
|---|---|---|
| CN | 101114927 A | 1/2008 |
| KR | 100843022 B1 | 7/2008 |
| WO | 2006/049435 A1 | 5/2006 |

OTHER PUBLICATIONS

3GPP TS 23.272 V8.2.0, 3rd Generation Partnership Project; Technical Specification Group Services and System Aspects; Circuit Switched Fallback in Evolved Packet System; Stage 2, (Release 8), Dec. 2008, 46 pages, http://www.3gpp.org.
3GPP TS 24.011 V8.0.0, 3rd Generation Partnership Project; Technical Specification Group Core Network and Terminals; Point-to-Point (PP) Short Message Service (SMS), support on mobile radio interface, (Release 8), Dec. 2008,105 pages, http://www.3gpp.org.
3GPP TS 23.060 V8.3.0, 3rd Generation Partnership Project; Technical Specification Group Services and Systems Aspects; General Packet Radio Service (GPRS); Service description; Stage 2, (Release 8), Dec. 2008, 271 pages, http://www.3gpp.org.
International Search Report PCT/JP2010/050995 dated Mar. 9, 2010.
Office Action, dated Jul. 31, 2013, issued by the State Intellectual Property Office of the People's Republic of China, in counterpart Application No. 201080006329.9.
"SMS support in CS Fallback for EPS", T-Mobile, 3GPP TSG SA WG2, Meeting #65, TD S2-084281, May 12-16, 2008, 8 pages.

* cited by examiner

*Primary Examiner* — John Blanton
*Assistant Examiner* — Diane Lo
(74) *Attorney, Agent, or Firm* — Sughrue Mion, PLLC

(57) ABSTRACT

The invention provides for a method of controlling release of SMS transport resources between User Equipment and a MME of a communications network, wherein the release is permitted subsequent to a Control Protocol Acknowledge signal at a Mobile Switching Centre of the network, and in particular a method wherein the release is initiated by the MME responsive to receipt of a release signal, and further provides for a SGs Interface, and MME arranged to be employed with such a control method.

8 Claims, 4 Drawing Sheets

SMS TRANSPORT RESOURCE CONTROL

CROSS REFERENCE TO RELATED APPLICATIONS

This application is a National Stage of International Application No. PCT/JP2010/050995, filed on Jan. 20, 2010, which claims priority from British Patent Application No. 0901539.7, filed on Jan. 30, 2009, the contents of all of which are incorporated herein by reference in their entirety.

TECHNICAL FIELD

The present invention relates to the control of Short Message Service (SMS) transport resources within a communications network and, in particular, an Evolved Packet System (EPS) arranged with Circuit-Switched (CS) capable terminals.

BACKGROUND ART

In order to facilitate voice communication within Long Term Evolution (LTE) networks, various proposals have been forthcoming of which one comprises so-called CS fallback in which a LTE User Equipment (UE) is arranged to "fallback" to, for example, GSM or UMTS, for the receipt/transmission of incoming/outgoing voice communication.

CS fallback within EPS is primarily realised by using the SGs interface mechanism provided between a Mobile Switching Centre (MSC) server/Visitor Location Register (VLR) or a Mobile Switching Centre (MSC)/Visitor Location Register (VLR) and the Mobility Management Entity (MME).

The SGs interface functionality is derived from the mechanisms specified for the Gs interface in accordance with 3GPP TS 23.060.

Further, from 3GPP TS 23.272 there is provided an arrangement for transporting SMS messages between a UE operating within a E-UTRAN (Evolved UMTS Terrestrial Radio Access Network) and the MSC within a CS domain, by way of the SGs interface between the MME and the MSC/VLR for UEs attached to both EPS services and non-EPS services (CS services).

CITATION LIST

Non Patent Literature

NPL Document 1: 3GPP TS 23.060
NPL Document 2: 3GPP TS 23.272
NPL Document 3: 3GPP TS 24.011

DISCLOSURE OF THE INVENTION

Problem(s) to be Solved by the Invention

However, this known proposal is disadvantageously limiting in relation to the ongoing management of resources between the MME and UE when arranged for SMS transport between the UE and the MSC/VLR. Although, from the stage 2 in step 10 in FIG. 8.2.2.1 of 3GPP TS 23.272 it is suggested that the MME may release the resources associated with the SMS transfer there is no indication whatsoever as regards the nature and/or timing of any such release.

Control of the SMS resources therefore remains a limiting factor preventing efficient deployment and, as required, release of such services.

The present invention seeks to provide for a method of controlling release of SMS transport resources, and also a related MME and SGs interface offering advantages over known such methods and devices.

Means to Solve the Problem(s)

According to one aspect of the present invention there is provided a method of controlling release of SMS transport resources between User Equipment and a Mobility Management Entity (MME) of a communications network, wherein the said release is permitted subsequent to a Control Protocol Acknowledge signal at a Mobile Switching Centre of the said network.

The method is particularly advantageous in that it can be readily identified when the signaling connection between the UE and the MME is not use any more.

Preferably, the said release can be permitted subsequent to receipt of a Control Protocol Acknowledge signal at the Mobile Switching Centre.

Further, the said release may be permitted subsequent to despatch of a Control Protocol Acknowledge signal from the Mobile Switching Centre.

Advantageously, the MME can be arranged to release the said resources. In particular, the MME can release the said resources responsive to receipt of a release request signal.

According to another aspect of the present invention there is provided a method of controlling release of SMS transport resources between a User Equipment and a MME of a communications network, wherein the said release is initiated by the MME responsive to receipt of a release request signal.

The release request signal can be delivered from the Mobile Switching Centre.

Further, the release request signal can be introduced into the Gs Interface of the network.

Of course it should be appreciated that the method can be provided within an Evolved Packet System network. The User Equipment can then comprise a Circuit-Switched capable device such as a CS-fallback capable device.

Of course, the said release can be permitted subsequent to a Control Protocol Acknowledge signal at a MSC/VLR.

According to a further aspect of the present invention there is provided a MME of a communications network including User Equipment and arranged with SMS transport resources there between, the MME further being arranged to control release of the said resources.

As will be appreciated, the MME can be arranged to release the said resources responsive to receipt of a release request signal.

Preferably the MME is arranged to release the said resources responsive to a release request signal received from a Mobile Switching Centre within the network, although the actual timing of this will depend upon other traffic is present on the signaling connection between the UE and the MME.

As noted above the MME can be provided within an Evolved Packet System network, and also for communication with a Circuit-Switched capable User Equipment such as CS-fallback capable UE.

According to yet a further aspect of the present invention there is provided an SGs interface arranged to be provided between a MME and a Mobile Switching Centre of a communications network, and arranged for delivering a release request signal to the MME for control at the MME of the release of SMS transport resources between the MME and a User Equipment of the network.

Advantageously, the release request signal originates from a Mobile Switching Centre of the network in the CS domain.

The interface can further be arranged to be provided within an Evolved Packet System network.

A further interface can be arranged for use within a network employing a Circuit-Switched capable User Equipment as noted above.

Effect(s) of the Invention

Thus, it should be appreciated that the present invention can be arranged readily to cater for error, or abnormal, situations which might occur for example in the MSC. A maximum number of re-transmission attempts for a Control Protocol Acknowledge signal can be provided for and, in combination with a timer function, should the that number be reached and/or the timer expire, the MSC can be prompted to request release of the connection also in such error/abnormal conditions.

BRIEF DESCRIPTION OF THE DRAWINGS

The invention is described further hereinafter, by way of example only, with reference to the accompanying drawings in which.

BEST MODE FOR CARRYING OUT THE INVENTION

Figure 1:
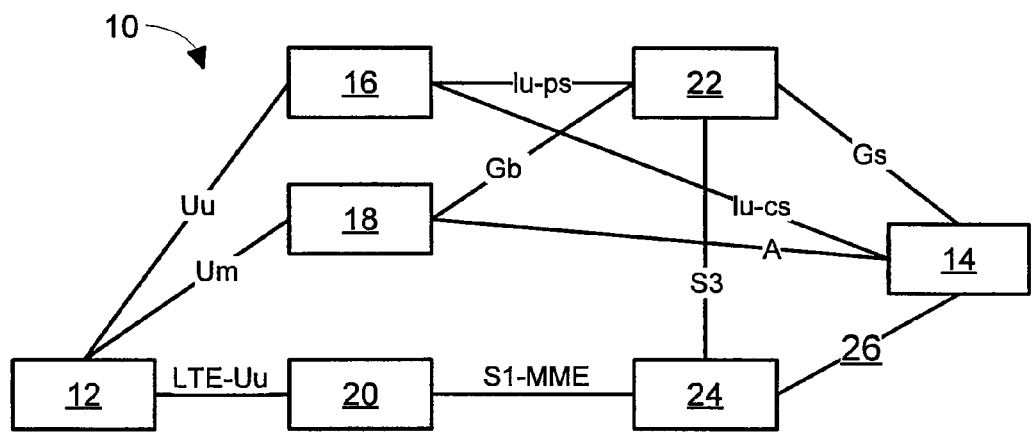
FIG. 1 is a block diagram of an EPS architecture employing an MME and SG interface according to an embodiment of the present invention.

Turning first to FIG. 1, there is provided a block diagram illustrating a network 10 employing an EPS architecture and illustrating communication between a UE 12 such as a cellular phone handset, and a MSC server 14. The architecture is arranged for CS fallback so as to allow for the incorporation of voice data onto the LTE system of the EPS architecture and various network possibilities for the UE 12 are illustrated such as UTRAN (UMTS Terrestrial Radio Access Network) 16, GERAN (GSM EDGE Radio Access Network) 18 and E-UTRAN 20.

While the UTRAN 16 and GERAN 18 can connect to the MSC server 14 by way of a Serving GPRS (General packet radio service) support Node 22, the E-UTRAN 20 connects to the MSC server 14 by way of a MME 24 and by way of the SGs interface mechanism 26 provided between the MSC server/VLR and the MME.

As is discussed further, the MME 24 embodying the present invention is arranged to provide control of the release of SMS transport resources and is arranged to receive a resource-release initiating message from the MSC server 14 by way of the SGs interface mechanism 26 which itself also comprises novel functionality in accordance with the present invention.

The arrangement provided within FIG. 1, and in accordance with an embodiment of the present invention, therefore provides a mechanism for the release of SMS transport resources between the MME 24 and the UE 12 and which is advantageously initiated only once a signaling exchange between the UE and the MSC/VLR has been completed and is described in further detail below.

It is proposed that the MME receives a clear request from the MSC/VLR when the signaling exchange between the UE and the MSC/VLR is complete. In this way, the MME can identify with certainty that the signaling connection between the UE and the MME is not used nor required anymore by the MSC/VLR and such that the MME has full control of the Non-Access Stratum (NAS) signaling connection.

As will be appreciated from the following description, various messages, whether release request, release or error indication messages, arise on the SGs and they can be arranged to contain an identifier of the UE related to such messages. The identifier can be the IMSI (International Mobile Subscriber Identity) and this will allow the MME to know which signaling connection to release when receiving for example the release request message. Likewise if an error or problem has arisen, it will allow the MSC to know for which UE there is a problem.

Figure 2:
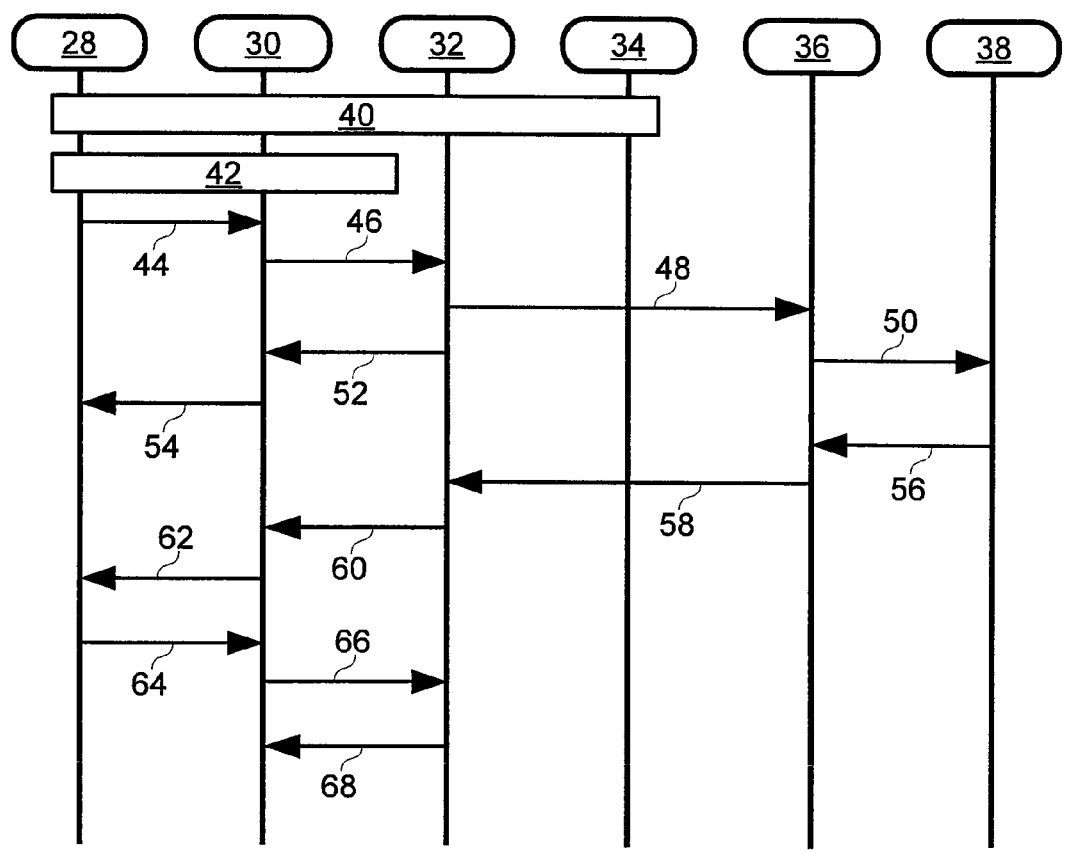
FIG. 2 is a timing diagram for Mobile Originating SMS in idle mode and according to one aspect of the present invention.

Discussed below with reference to FIG. 2 is the sequence for MO SMS (Mobile-Originated Short Message Service) in EPS. It is based on FIG. 8.2.2.1 from TS 23.272 although the SMS PDUs (Protocol Data Units) have been added, and the sequence has been extended to cover the full exchange of SMS PDUs.

Advantageously, the MME waits for the final SMS PDU (CP ACK) from the UE in order to transfer it to the MSC/VLR. The resources for the MO SMS are then only released after the CP-ACK message has been received. However, it is appreciated that the MME cannot identify the contents of the SMS message, so the trigger for the SMS release therefore derives from the MSC/VLR, which advantageously knows whether the SMS transfer is complete. In the illustrated embodiment it is proposed to introduce such release via the SGs interface noted.

With reference therefore to FIG. 2, there is illustrated a diagram of signaling arising between a UE 28, the MME 30, MSC/VLR 32, Home Location Register (HLR)/Home Subscriber Server (HSS) 34, SMS—Interworking MSC 36 and Service Centre 38.

As will be appreciated, the signaling arises in relation to a CS fallback attach procedure 40 between the UE 28 and MME 30, MSC/VLR 32 and the HLR/HSS 34 and commences with a UE triggered service request 42 which leads to an uplink Non-Access Stratum (NAS) transport signal 44 comprising Control Protocol Data and Relay Protocol Data elements.

Uplink unitdata messaging 46 including CP data includes RP data is then delivered from the MME 30 to the MSC/VLR 32 via the SGs interface and the MSC/VLR 32 initiates the forwarding of a short message 48 to the SMS-IWMSC 36 and onward message transfer 50 to the SC 38.

Subsequent to receipt of the uplink unitdata 46, the MSC/VLR 32 is arranged to return a downlink unitdata signal 52 including a CP acknowledge element to the MME 30 via the SGs interface and the MME 30 in turn, provides a downlink NAS transport signal 54 to the UE 28 which likewise includes a CP acknowledge element.

Back at the SC 38, and subsequent to the receipt of the message transfer 50, a delivery report 56 is returned to the SMS IW MSC 36 which initiates a onward delivery report 58 to the MSC/VLR 32 and the MSC/VLR 32 then delivers a downlink unitdata signal 60 including CP data which includes RP acknowledge elements to the MME 30 via the SGs interface so as to initiate a further downlink NAS transport signal 62 which, this time, includes CP data which includes RP acknowledge elements.

Importantly, and in accordance with the present invention, at this stage the MME does not yet release the resources associated for the SMS transfer as noted above.

An uplink NAS transport signal 64 including a CP acknowledge element is then delivered from the UE 28 to the MME 30 which, initiates an uplink unitdata signal 66 from the MME 30 to the MSC/VLR 32 likewise including a CP acknowledge element.

Receipt of this CP acknowledge element at the MSC/VLR 32 initiates an all important release request signal 68 delivered from the MSC/VLR 32 to the MME 30.

The release request signal 68 provides a confirmed indication to the MME 30 that the resources are not required anymore for the MSC such that the MME 30 can then release the resources whenever most appropriate and depending upon other conditions specific to EPS traffic.

With regard to the details of FIG. 2, it should be appreciated that an embodiment of the invention can allow for control signaling in an opposite direction (i.e. from the MME to the MSC).

For example, if the NAS signaling connection between the UE 28 and the MME 30 becomes lost, the MSC/VLR 32 can be informed by way of a "release indication" message. The MSC/VLR 32 can then take appropriate actions such as suggested in TS 24.011 subclause 5.3.4 for example. Also an "error" indication could be usefully sent from the MME 30 to the MSC/VLR 32 in situations of non-delivery of the SMS message by the MME 30 to the UE 28. Then the SMC entity in the MSC can take appropriate actions such as suggested in TS 24.011 subclause 5.3.4 for example.

It should be appreciated that in these further instances, the failure/error prevents the signaling after Downlink NAS Transport 62 illustrated in FIG. 2 from arising.

Figure 3:
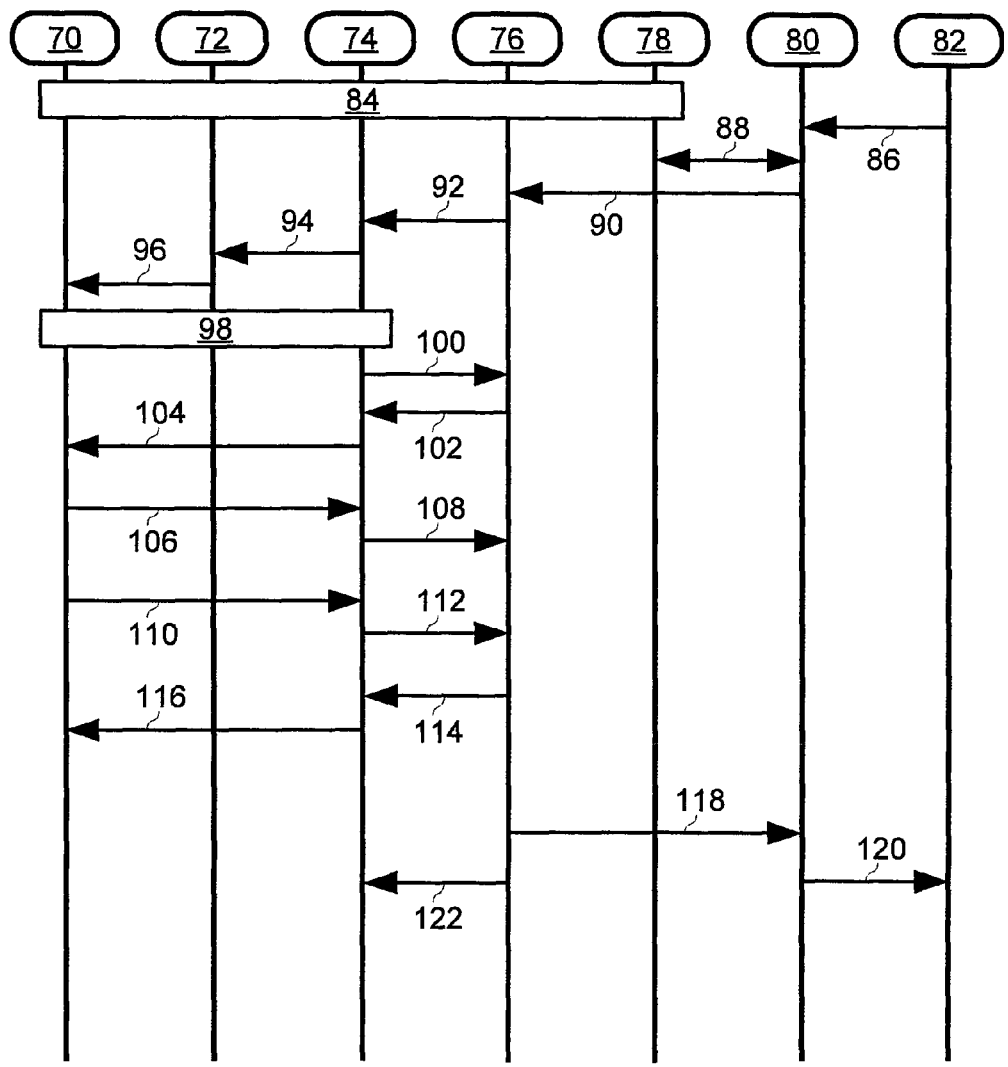
FIG. 3 is a timing diagram relating to a Mobile Terminating SMS in idle mode and according to an aspect of the present invention.

Turning now to FIG. 3, there is provided a signaling diagram relating to a Mobile Terminating SMS in idle mode.

Again the resources for the MT SMS are to be only released after the CP-ACK message has been sent by the MSC/VLR and as before the MME will not know the contents of the SMS message, so the trigger for the SMS release is derived from the MSC/VLR again, which is the only entity knowing whether the SMS transfer is complete. The release request from the MSC/VLR to the MME applies in relation to the signaling therefore of FIG. 3 as it did for FIG. 2.

If incorporating this at this stage is not feasible, then I suggest we proceed with current proposal only, considering the short timescale.

Turning therefore in greater detail to FIG. 3, there is illustrated signaling arising in relation to a UE 70, eNode B 72, MME 74, MSC/VLR 76, HLR/HSS 78, SMS-GMSC 80 and SC 82.

The signaling illustrated again arises in relation to a CS fallback attach procedure 84 for the UE 70, eNode B 72, MME 74, MSC/VLR 76 and HLR/HSS 78 and, since this illustration relates to a Mobile Terminating Procedure, the signaling commences with a message transfer signal 86 from the SC 82 to the SMS-GMSC 80 which then initiates a routine exchange messaging 88 with the HLR/HSS 78. Subsequently, signaling 90 sending the short message from the SMS-GMSC 80 to the MSC/VLR 76 which initiates a series of paging signals 92, 94, 96 to the MME 74, eNode B 72 and UE 70 in turn as illustrated.

A service request procedure 98 then commences with a service request signal 100 delivered from the MME 74 to the MSC/VLR 76 which returns a downlink unitdata signal 102 including CP data which includes RP data elements via the SGs interface.

Upon receipt of the downlink unitdata signal 102, the MME 74 delivers a downlink NAS transport signal 104 including CP data which includes RP data elements to the UE 70 which, in turn, sends an uplink NAS transport signal 106 including CP acknowledge elements to the MME 74 and which initiates uplink unitdata signal 108, likewise including CP acknowledge elements to the MSC/VLR 76.

Then, the UE 70 also delivers uplink NAS transport signaling 110 including CP data and RP acknowledge elements to the MME 74 which in turn, delivers uplink unitdata including such CP data and RP acknowledge elements 112 to the MSC/VLR 76 via the SGs interface.

In turn, the MSC/VLR 76 sends a downlink unitdata signal 114 including a CP acknowledge element to the MME 74 via the SGs interface.

Importantly, release of the SMS resources again does not occur at this time but rather, in accordance with the invention, only subsequent to a specific release request signal delivered from the MSC/VLR 76 to the MME 74.

Upon receipt of the downlink unitdata signal 114, the MME 74 delivers a downlink NAS transport signal 116 to the UE 70 and which includes the CP acknowledge element. Subsequently, the MSC/VLR 76 sends a delivery report 118 to the SMS-GMSC 80 which, in turn, forwards on a delivery report signal 120 to the SC 82.

Only at this stage does the MSC/VLR 76 deliver a release request signal 122 to the MME 74 so as to initiate release of the SMS resources by the MME 74.

Upon receipt of the release request signal 122, the MME 74 can readily identify that the resources are not required anymore for the MSC 76 such that they can be released at any appropriate time depending upon other conditions specific to the EPS traffic.

Considering now possible interaction with SMS when concatenation applies, for MO SMS, the UE 70 will not send final CP-ACK until there are SMS transactions ongoing. So the end of SMS transfer for SMS concatenation remains the CP-ACK received in the MSC/VLR 76 from the UE 70. However, for MT SMS, the MSC/VLR 76 is responsible for the resources and can send the release request to the MME 74 at any time, when it knows that all SMS transactions are complete.

For a scenario involving simultaneous MO and MT SMS, the MSC/VLR is aware of all ongoing transactions and can send the release request to the MME when all SMS transfers are complete. The MSC/VLR can then decide when to send the release request.

For abnormal cases or error cases at the MSC/VLR side it is also proposed to use such a release request.

Figure 4:
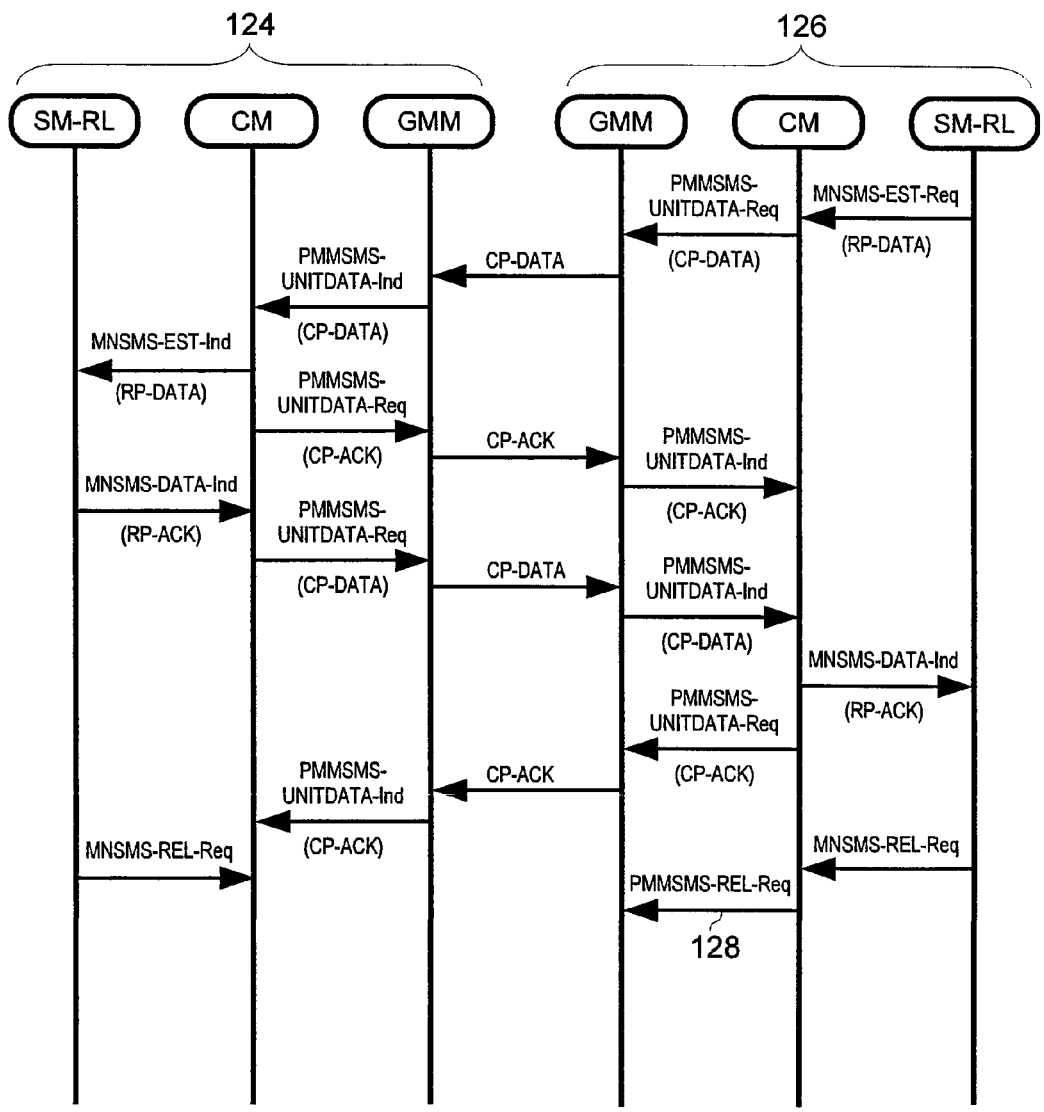
FIG. 4 is a timing diagram illustrating a relationship between an embodiment of the present invention and known proposals for GPRS Mobile Terminating Messaging.

In summary, the invention proposes to introduce a release request on SGs interface for the MSC/VLR to indicate to the MME that the SMS transaction is complete. FIG. 4 is provided to illustrate this further and comprises an excerpt from 3GPP TS 24.011 for GPRS Mobile Terminated Messaging on CM-sublayer in Iu mode and between a mobile station side 124 and a network side 126. Importantly, the last step indicates a PMMSMS-REL-Req message 128 from the CM layer to the GMM layer in SGSN and the illustrated embodiment of the invention is based on an adaption of this to the interface between the MSC/VLR and the MME.

It should of course be appreciated that the invention is not restricted to the full details of the foregoing embodiment. For example, the control of the release procedure need not be provided only in relation to a CS fallback system, nor indeed to an EPS system. Also, the release indication could be used also in relation to signaling in addition to that for SMS between the MSC and the UE via the SGs interface.

Further, although the embodiments illustrated in FIGS. 2 and 3 relate to SMS transfer with the UE initially in idle mode, it should be appreciated that the invention can be readily employed in relation to UE in connected mode.

This application is based upon and claims the benefit of priority from United Kingdom patent application No. 0901539.7, filed on Jan. 30, 2009, the disclosure of which is incorporated herein in its entirety by reference.

The invention claimed is:

1. A method, performed in a visitor location register (VLR), as part of an SMS transport release procedure in a communications network, the method comprising:

the VLR, when an SMS transaction is complete, sending an SGs Release Request message to a Mobility Management Entity (MME), wherein said SGs Release Request message is sent after reception of a Control Protocol Acknowledge (CP-ACK) message for a Mobile Originating (MO) case, and wherein said SGs Release Request message is sent after sending a CP-ACK message for a Mobile Terminating (MT) case.

2. A method as claimed in claim 1, wherein the release request is permitted subsequent to receipt of a Control Protocol Acknowledge signal at the Mobile Switching Centre.

3. A method as claimed in claim 1, wherein the release request is permitted subsequent to dispatch of a Control Protocol Acknowledge signal from the Mobile Switching Centre.

4. A method as claimed in claim 1, wherein the Mobility Management Entity is arranged to release a resources.

5. A method as claimed in claim 4, wherein the Mobility Management Entity releases the resources responsive to receipt of a release request signal.

6. A method, performed in a Mobility Management Entity (MME) as part of an SMS transport release procedure, the method comprising:

the MME, when an SMS transaction is complete, receiving an SGs Release Request message from a visitor location register (VLR), wherein said SGs Release Request message is received after transmission of a Control Protocol Acknowledge (CP-ACK) message for a Mobile Originating (MO) case, and wherein said SGs Release Request message is received after receiving a CP-ACK message for a Mobile Terminating (MT) case.

7. A visitor location register (VLR) for performing part of an SMS transport release procedure in a communications network, the VLR comprising:

a transmitter arranged to, when an SMS transaction is complete, send an SGs Release Request message to a Mobility Management Entity (MME), wherein said SGs Release Request message is sent after reception of a Control Protocol Acknowledge (CP-ACK) message for a Mobile Originating (MO) case, and wherein said SGs Release Request message is sent after sending a CP-ACK message for a Mobile Terminating (MT) case.

8. A Mobility Management Entity (MME) as part of an SMS transport release procedure, the MME comprising:

a receiver arranged to, when an SMS transaction is complete, receive an SGs Release Request message from a visitor location register (VLR), wherein said SGs Release Request message is received after transmission of a Control Protocol Acknowledge (CP-ACK) message for a Mobile Originating (MO) case, and wherein said SGs Release Request message is received after receipt of a CP-ACK message for a Mobile Terminating (MT) case.

* * * * *